(12) United States Patent
Liebau

(10) Patent No.: US 10,479,292 B2
(45) Date of Patent: Nov. 19, 2019

(54) INTERIOR TRIM ELEMENT FOR A MOTOR VEHICLE

(71) Applicant: EuWe Eugen Wexler Holding GmbH & Co. KG, Lauf a. d. Pegnitz (DE)

(72) Inventor: Burkhard Liebau, Nuremberg (DE)

(73) Assignee: EuWe Eugen Wexler Holding GmbH & Co. KG, Lauf a. d. Pegnitz (DE)

( * ) Notice: Subject to any disclaimer, the term of this patent is extended or adjusted under 35 U.S.C. 154(b) by 0 days.

(21) Appl. No.: 15/894,354

(22) Filed: Feb. 12, 2018

(65) Prior Publication Data

US 2018/0162294 A1    Jun. 14, 2018

Related U.S. Application Data

(63) Continuation of application No. 15/029,473, filed as application No. PCT/EP2014/070206 on Sep. 23, 2014, now Pat. No. 9,896,041.

(30) Foreign Application Priority Data

Oct. 14, 2013  (DE) ........................ 10 2013 111 309

(51) Int. Cl.
*B60R 13/02*    (2006.01)

(52) U.S. Cl.
CPC .......... *B60R 13/0275* (2013.01); *B60R 13/02* (2013.01); *B60R 13/0268* (2013.01)

(58) Field of Classification Search
CPC .... B60R 13/04; B60R 13/02; B60R 2013/046
USPC ........ 296/1.08, 93, 146.11, 146.5, 204, 209; 701/450, 451, 452, 453
See application file for complete search history.

(56) References Cited

U.S. PATENT DOCUMENTS

| 3,448,550 | A | * | 6/1969 | Herr | ........................ | B60R 13/04 428/31 |
| 4,308,704 | A | * | 1/1982 | Lloyd | ..................... | B60R 13/04 296/210 |
| 4,961,605 | A | * | 10/1990 | Cawthron | ............... | B60R 13/04 293/128 |
| 5,108,801 | A | * | 4/1992 | Takahashi | ............... | B60R 13/04 24/292 |
| 5,409,746 | A | * | 4/1995 | Mimura | .................. | B60R 13/04 296/93 |
| 5,560,175 | A | * | 10/1996 | Soyka, Jr. | ............... | B60R 13/04 428/31 |
| 6,436,212 | B1 | | 8/2002 | Warner | | |

(Continued)

FOREIGN PATENT DOCUMENTS

| DE | 3822398 A1 | 1/1990 |
| DE | 202007002816.4 U1 | 6/2007 |

(Continued)

*Primary Examiner* — D Glenn Dayoan
*Assistant Examiner* — Sunsurraye Westbrook
(74) *Attorney, Agent, or Firm* — Rimon, P.C.

(57) ABSTRACT

An interior trim element for a motor vehicle, comprising a main part, more particularly a trough-shaped main part, that defines an interior space, and comprising at least one clip element, wherein the at least one clip element is pivotally hinged to the main part (2) via at least one film hinge, wherein the film hinge is formed on a shoulder created on an edge portion (4a) of the main part that partially delimits the interior space, the shoulder being offset with respect to the free end of the edge portion.

16 Claims, 3 Drawing Sheets

(56) References Cited

U.S. PATENT DOCUMENTS

Figure 1:
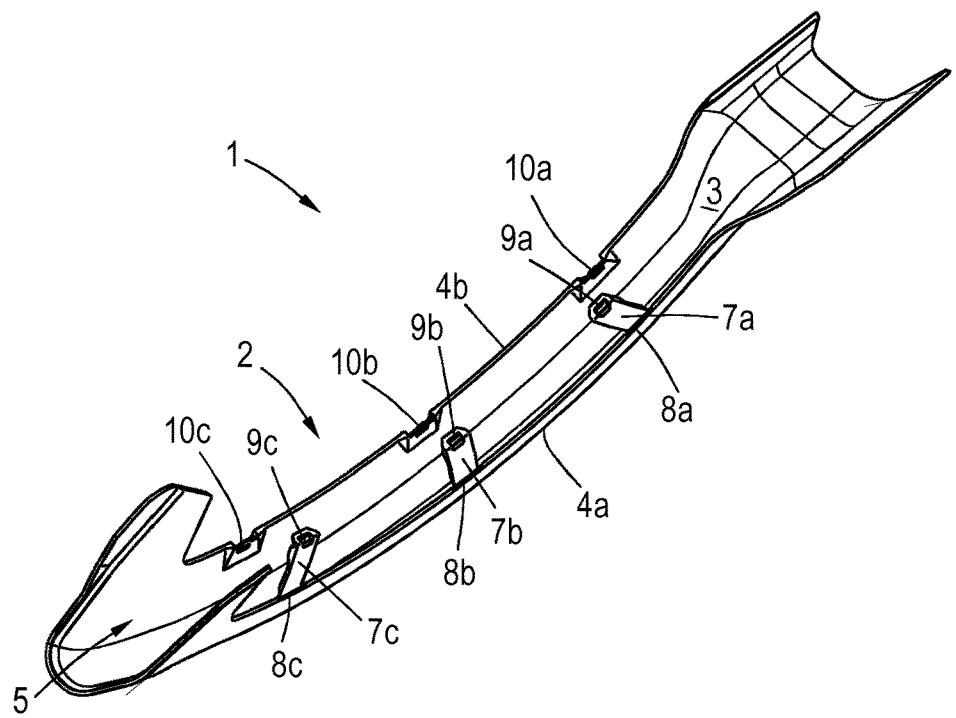

| | | | |
|---|---|---|---|
| 7,530,544 B2 * | 5/2009 | Takagi | ................. B28B 7/0011 |
| | | | 249/177 |
| 2007/0085361 A1 | 4/2007 | Hauser | |
| 2011/0127797 A1 | 6/2011 | Garnett | |
| 2015/0306842 A1 * | 10/2015 | Miyashita | ................. B32B 3/30 |
| | | | 428/141 |

FOREIGN PATENT DOCUMENTS

| | | |
|---|---|---|
| DE | 102007037328.9 A1 | 3/2009 |
| EP | 0215189 A2 | 3/1987 |
| EP | 1743805 A1 | 1/2007 |

\* cited by examiner

INTERIOR TRIM ELEMENT FOR A MOTOR VEHICLE

CROSS-REFERENCE TO RELATED APPLICATIONS

This application is a continuation of U.S. application Ser. No. 15/029,473 filed Apr. 14, 2016, which was a U.S. 371 National Stage entry of International Application Serial No. PCT/EP2014/070206 filed Sep. 23, 2014, which claims priority to German Application No. 102013111309.5 filed Oct. 14, 2013. The contents of each of these applications are hereby incorporated herein by reference in their entirety as if set forth verbatim

DESCRIPTION

The invention relates to an interior trim element for a motor vehicle, comprising a main body, more particularly a trough-shaped main body, which delimits an interior space, and comprising at least one clip element, wherein the at least one clip element is pivotably attached to the main body by means of at least one film hinge.

Corresponding interior trim elements or interior trim components for motor vehicles are known per se. The interior trim elements comprise a main body, which delimits an interior space and is typically bowl- or trough-shaped, and a clip element, which is pivotably attached by means of a film hinge, typically in the region of a free end of an edge portion of the main body.

Corresponding interior trim elements are usually formed from thermoplastic materials. Pivoting movements of the clip element relative to the main body can lead to what are referred to as strain whitening marks in the region of the film hinge. "Strain whitening" refers to a phenomenon observed in thermoplastic materials that is attributable to mechanical stress, wherein mechanically induced stresses, especially tensile stresses, in the plastics material lead to a change in the optical properties, especially the refraction behavior, leading to milkiness and/or discoloration in the mechanically stressed region of the plastics material.

The formation of corresponding strain whitening marks, which usually impair the optical impression made by corresponding interior trim elements, is virtually impossible to avoid owing to the material, and therefore there is a need to conceal corresponding strain whitening marks in some other way.

It is therefore the underlying object of the invention to indicate an improved interior trim element for a motor vehicle.

According to the invention, the object is achieved by an interior trim element of the type stated at the outset which is distinguished by the fact that, on the main-body side, the at least one film hinge is formed on a shoulder created on an edge portion of the main body that partially delimits the interior space, wherein the shoulder is arranged offset with respect to the free end of the edge portion.

The interior trim element according to the invention, which can of course also be referred to as an interior trim component, is thus distinguished by a special design arrangement of the film hinge connecting the main body belonging to it to the or a clip element belonging to it. According to the invention, the film hinge is attached to or formed on a shoulder on the main-body side, i.e. by means of its region attached to or articulated on the main body, which shoulder, in turn, is arranged on or attached to an edge portion of the main body that partially delimits the interior space of the main body. Thus, the shoulder is arranged offset with respect to the free end of the edge portion by an amount to be determined with a view to a specific design implementation of the interior trim element according to the invention. The shoulder is therefore not arranged directly in the region of the free end of the edge portion. The shoulder thus typically does not form part of the free end of the edge portion. The offset arrangement of the shoulder provided according to the invention typically has the effect that the shoulder projects at least partially, in particular completely, into the interior space of the main body.

Accordingly, the film hinge is also not directly formed on or attached to the free end of a corresponding edge portion on the main-body side but is formed on or attached to the shoulder specially provided for the attachment of the film hinge on the main-body side, which shoulder, as mentioned, is arranged offset by a certain amount on the main-body side with respect to the free end of the edge portion, that is to say, in particular, is arranged so as to be spatially separate from the free end of the edge portion.

Thus, the principle according to the invention is based on a specially selected design arrangement or attachment of the film hinge on/to the main body or an edge portion belonging to the latter, said arrangement or attachment concealing the strain whitening marks that are typically inevitable with corresponding film hinges. The offset arrangement or attachment of the film hinge on or to the main body implemented by means of the shoulder is thus chosen in such a way that corresponding strain whitening marks, especially in the state of the interior trim element in which it is fitted to a motor vehicle or a vehicle body, are invisible to a user. It is accordingly preferred that the shoulder be arranged offset with respect to the free end of the edge portion in such a way that the film hinge is arranged on a nonvisible side of the interior trim element in the state of the interior trim element in which it is fitted to a vehicle body. In other words, the film hinge is therefore attached to the main body in such a way that it is not visible or is concealed in the state of the interior trim element in which it is fitted to a motor vehicle or a vehicle body.

Provision can be made here for the shoulder to be offset inward by a certain amount in comparison with the free end of the edge portion, based on the longitudinal extension of said portion when viewed in cross section. The term "longitudinal extension of the edge portion" should be taken to mean the length or longitudinal extent or height or vertical extent of the edge portion between the bottom of the main body and the end associated with the edge portion when viewed in cross section. Thus, the shoulder can be arranged or attached to the edge portion in a manner offset axially inward, i.e. in the direction of the bottom of the main body, by a certain amount, based on the longitudinal (central) axis of the edge portion when viewed in cross section, that is to say, in particular, by an amount to be determined with a view to a specific design implementation of the interior trim element according to the invention.

Provision can furthermore be made for the shoulder to be offset inward by a certain amount from an outer surface forming an outer side of the main body, based on the transverse extension of the edge portion when viewed in cross section. The term "transverse extension of the edge portion" should be taken to mean the width or transverse extent of the edge portion, when viewed in cross section, between an outer surface forming an outer side of the main body facing away from the interior space and an inner surface forming an inner side of the main body facing the interior space and thus typically the wall thickness of the edge portion. The shoulder can thus be arranged offset or attached to the edge portion in a manner offset radially inward, that is to say in the direction of the interior space of the main body, by a certain amount, based on the longitudinal (central) axis of the edge portion when viewed in cross section, that is to say, in particular, by an amount to be determined with a view to a specific design implementation of the interior trim element according to the invention. As mentioned, the shoulder can project at least partially, in particular completely, into the interior space.

Particularly in the case in which the shoulder is offset inward by a certain amount, based on the longitudinal extent of the edge portion when viewed in cross section, and the shoulder is arranged or attached in a manner offset by a certain amount from an outer surface forming an outer side of the main body, based on the transverse extension of the edge portion when viewed in cross section, a trough-like depression can be formed between the free end of the edge portion and the shoulder.

In all cases, the offset arrangement of the shoulder is of course such that the functioning of the film hinge, i.e. the pivotable attachment of the clip element implemented by means of said hinge, is ensured.

In particular, it is ensured here that, as is preferably provided for, the clip element can be pivoted between a first pivoted position, in which it allows access to the interior space, and a second pivoted position, in which it at least partially closes or prevents access to the interior space. The first pivoted position can be referred to as the open position of the clip element, while the second pivoted position can be referred to as the closed position of the clip element.

An expedient embodiment of the interior trim element according to the invention envisages that the clip element is provided in the region of its free end remote from the film hinge with a fastening portion, by means of which the clip element can be fastened detachably on a fastening portion, corresponding thereto, of the main body, particularly in the above-described second pivoted position. By means of the fastening portions on the clip element and the main body, the clip element can thus be fastened detachably by its free end on the main body. By means of the fastening point implemented by means of the film hinge, nondetachable fastening of the clip element on the main body is provided, while, by means of the fastening point implemented by means of the fastening portion, detachable or reversible fastening of the clip element on the main body, i.e. on a fastening portion corresponding thereto, is provided. Typically, the fastening portion on the main body is provided on an edge portion of the main body which lies opposite the edge portion on which or to which the film hinge is arranged or attached by means of the shoulder.

The fastening portion on the clip element and that on the main body can in each case be at least one latching/snap-in element. Equally, the fastening portion on the clip element and that on the main body can comprise a snap-in element. Latching/snap-in elements are advantageous since detachable fastening of a first component on a second component can be achieved by means thereof in a manner which is relatively simple in terms of design. Different fastening or retaining and release forces can furthermore be provided selectively through the specific embodiment of the respective latching/snap-in elements.

The main body and the clip element are typically plastic components, i.e. components formed from plastics materials. The main body and/or the clip element and/or the film hinge and/or the shoulder are thus typically formed from a thermoplastic material, e.g. acrylonitrile butadiene styrene (ABS), polyamide (PA), polycarbonate (PC), polyethylene (PE), polypropylene (PP) or polystyrene (PS) or from a mixture of different plastics materials, referred to as "blends". Thus, the term "plastics material" also includes mixtures of at least two different plastics materials, which should also be taken to include plastics materials of the same type chemically but with different molecular masses. Of course, the abovementioned list of plastics materials is only of an illustrative nature and in no way exhaustive.

Typically, all the stated components or portions of components of the interior trim element, i.e. the interior trim element overall, are formed from a plastics material, optionally the same plastics material. This considerably simplifies the production of the interior trim element since all components or portions of components belonging to said element can be produced jointly in a single plastics injection-molding process, i.e. simultaneously or at staggered times. Thus, in connection with the production of the interior trim element, single- or multi-component injection-molding processes, in particular, are conceivable. It is therefore conceivable or preferred from a manufacturing point of view that the main body and the clip element and the film hinge and the shoulder are formed integrally or in one piece with one another.

Another expedient embodiment of the interior trim element according to the invention envisages that the interior space of the main body serves as a receiving region for functional components of a motor vehicle equipped with the interior trim element. Consequently, certain functional components, e.g. electrical line links, of a motor vehicle or of a certain component on the motor vehicle, e.g. a tailgate, can be integrated into the main body and thus accommodated in an efficient way in view of the installation space, which is typically tightly dimensioned.

In particular, the main body associated with the interior trim element according to the invention is of u-shaped design or substantially u-shaped design when viewed in cross section. The main body therefore has, in particular, a bowl- or trough-shaped configuration.

It is advantageous if the interior trim element is designed in such a way that, particularly in the upward-pivoted state of the clip element, i.e. when the clip element is in the first pivoted position described above, it does not have any undercuts. From a manufacturing perspective, the interior trim element can thus be produced without the need for complex injection mold geometries. In particular, no complex ejector and/or slide elements have to be provided on the injection mold since gating can take place via the bottom side of the main body to be produced and removal of the interior trim element from the injection mold can take place counter to the gating direction.

Of course, all the embodiments connected with the interior trim element also apply to the case in which the interior trim element according to the invention has a plurality of clip elements attached to the main body by respective film hinges.

In particular, the interior trim element according to the invention is a tailgate trim component. This is to be taken to mean a component which is provided as an interior trim element in the region of a tailgate on the motor vehicle and is thus provided in the region of the tailgate or of a component connecting the tailgate to the vehicle body in order to cover or clad, in particular optically, portions associated with the vehicle body or tailgate.

Figure 2:
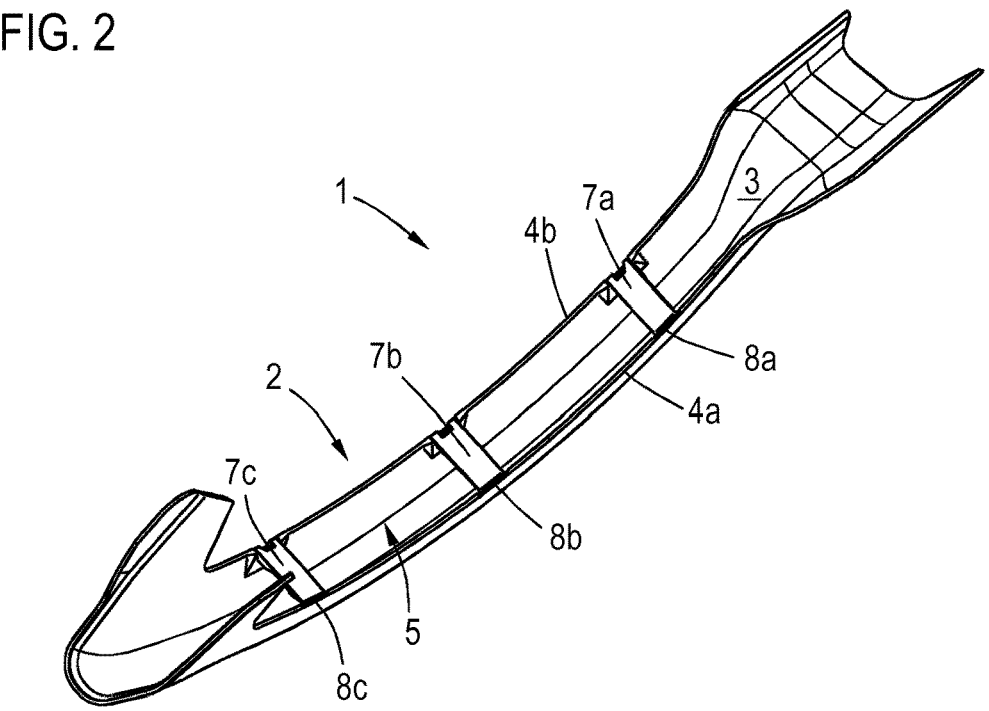
Figure 3:
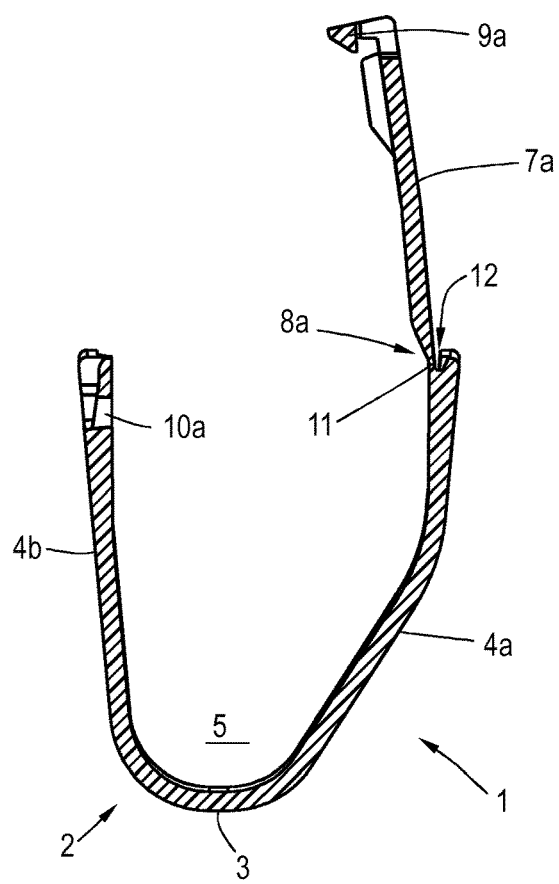
Figure 4:
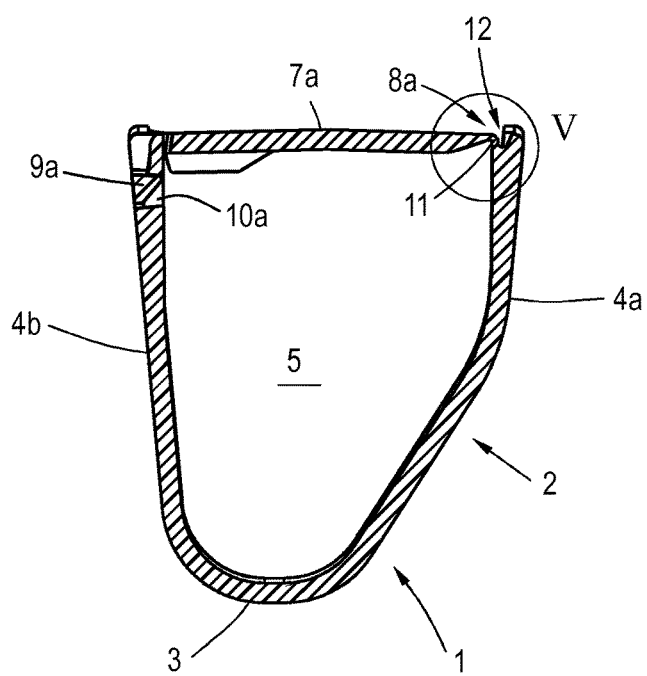
Figure 5:
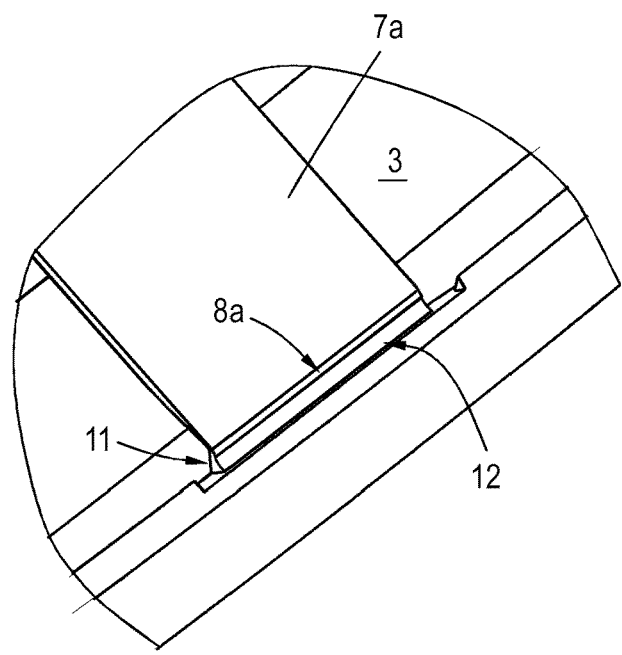
Figure 6:
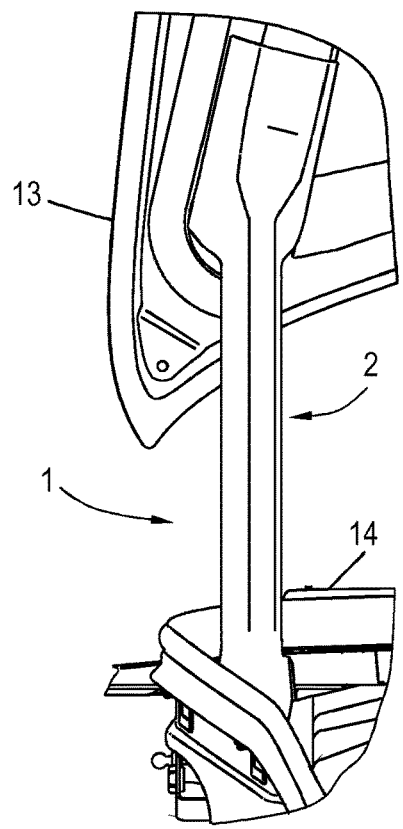

Further features, advantages and details of the invention will become apparent from the illustrative embodiments described below and from the drawings, in which:

FIGS. 1 and 2 each show a perspective view of an interior trim element according to one illustrative embodiment of the invention, FIGS. 3 and 4 each show a section through an interior trim element according to one illustrative embodiment of the invention, and FIG. 5 shows an enlarged illustration of the detail V shown in FIG. 4; and FIG. 6 shows an installation situation of an interior trim element according to one illustrative embodiment of the invention fitted in a motor vehicle.

FIGS. 1 and 2 each show a perspective view of an interior trim element 1 according to one illustrative embodiment of the invention. FIGS. 3 and 4 each show a section through an interior trim element according to one illustrative embodiment of the invention.

The interior trim element 1 shown in the figures is a tailgate trim component, and therefore a component which is provided in the region of a tailgate 13 on the motor vehicle in order to cover or clad, in particular optically, portions, associated with the vehicle body or tailgate, of a component connecting the tailgate 13 to the vehicle body 14 (cf. FIG. 6).

The interior trim element 1 comprises a main body 2, which is of substantially u-shaped and thus trough-shaped design when viewed in cross section. By means of a bottom portion 3 and two edge portions 4*a*, 4*b* branching off or projecting away from the latter at a (right) angle at the edges, the main body 2 thus delimits an interior space 5, which serves, for example, to accommodate or integrate functional components of the motor vehicle, e.g. electrical lines. At the end, based on its longitudinal (central) axis, the main body 2 can be connected or is to be connected to a vehicle body (cf. FIG. 6).

Clip elements 7*a*, 7*b*, 7*c* are pivotably attached by means of respective film hinges 8*a*, 8*b*, 8*c* to a region of the edge region 4*a* on the right in FIGS. 1-4, said region of edge region 4*a* being central with respect to the longitudinal extent of the main body 2. In FIGS. 1 and 3, the clip elements 7*a*, 7*b*, 7*c* can be pivoted into a first pivoted position (open position), in which they allow full access to the interior space 5, and into a second pivoted position (closed position) shown in FIGS. 2 and 4, in which they at least partially prevent access to the interior space 5.

In the pivoted position shown in FIGS. 2 and 4, the clip elements 7*a*, 7*b*, 7*c* are each fastened detachably on the edge portion 4*b* situated opposite edge portion 4*a*. Fastening is obtained through the interaction of fastening portions 9*a*, 9*b*, 9*c* on the clip elements and fastening portions 10*a*, 10*b*, 10*c*, corresponding thereto, on the edge portion. The fastening portions 9*a*, 9*b*, 9*c* on the clip elements and the fastening portions 10*a*, 10*b*, 10*c* on the edge portion are each latching/snap-in elements, i.e. the fastening portions 9*a*, 9*b*, 9*c* on the clip elements can latch or snap reversibly into the fastening portions 10*a*, 10*b*, 10*c* on the edge portion.

As can be seen especially from FIGS. 3, 4 and 5, the film hinges 8*a*, 8*b*, 8*c* by means of which the clip elements 7*a*, 7*b*, 7*c* are in each case attached to edge portion 4*a* of the main body 2, are attached to a shoulder 11 on the main-body side. The shoulder 11 is likewise attached to edge portion 4*a*. As can be seen, however, the shoulder 11 is not attached or arranged in the region of the free end of edge portion 4*a* but is attached or arranged offset with respect to the free end of edge portion 4*a*.

The arrangement of the shoulder 11 in a manner offset relative to the free end of edge portion 4*a* provides a possibility of concealing the "strain whitening" which occurs over time owing to the material in the case of a pivoting motion of the film hinges 8*a*, 8*b*, 8*c*.

As can be seen especially from FIGS. 3 and 4, the shoulder 11 is offset inward by a certain amount in comparison with the free end of edge portion 4*a*, based on the longitudinal extension thereof (when viewed in cross section). The term "longitudinal extension of edge portion 4*a*" should be taken to mean the length or longitudinal extent or height or vertical extent of edge portion 4*a* between the bottom portion 3 of the main body 2 and the end associated with the edge portion. Thus, the shoulder 11 is arranged or attached to edge portion 4*a* in a manner offset axially inward, i.e. in the direction of the bottom portion 3 of the main body 2, by a certain amount, based on the longitudinal (central) axis of edge portion 4*a* when viewed in cross section.

In the same way, the shoulder 11 is offset inward by a certain amount from an outer surface forming an outer side of edge portion 4*a* or of the main body 2, based on the transverse extension of edge portion 4*a* (when viewed in cross section). The term "transverse extension of edge portion 4*a*" should be taken to mean the width or transverse extent of edge portion 4*a*, when viewed in cross section, between an outer surface forming the outer side of edge portion 4*a* or of the main body 2 facing away from the interior space 5 and an inner surface forming the inner side of edge portion 4*a* or of the main body 2 facing the interior space 5 and thus typically the wall thickness of edge portion 4*a*. The shoulder 11 is thus arranged offset or attached to edge portion 4*a* in a manner offset radially inward, that is to say in the direction of the interior space 5 of the main body 2, by a certain amount, based on the longitudinal (central) axis of edge portion 4*a* when viewed in cross section. The shoulder 11 thus projects into the interior space 5 of the main body 2.

It follows from this that a trough-like depression 12 is formed between the free end of edge portion 4*a* and the shoulder 11 (cf. especially FIG. 5).

The interior trim element 1 is an injection-molded plastics component and is thus formed from a thermoplastic material which can be injection-molded, e.g. polypropylene (PP). All the components belonging to the interior trim element 1, i.e. the main body 2, the clip elements 7*a*, 7*b*, 7*c*, the film hinges 8*a*, 8*b*, 8*c* and the shoulder 11 are embodied integrally, i.e. in one piece. In terms of manufacture, the interior trim element 1 can therefore preferably be produced in a joint injection-molding process.

As can be seen from FIG. 3, the interior trim element 1 is designed in such a way that, in the upward-pivoted state of the clip elements 7*a*, 7*b*, 7*c*, it does not have any undercuts. From a manufacturing perspective, the interior trim element 1 can thus be produced without the need for complex injection mold geometries. In particular, no complex ejector and/or slide elements have to be provided in the injection mold since gating can take place via the bottom portion 3 of the main body 2 of the interior trim element 1 to be produced and removal from the mold can take place counter to the gating direction.

FIG. 6 shows an illustrative installation situation of an interior trim element 1 according to one illustrative embodiment of the invention fitted in a motor vehicle. As mentioned, the interior trim element 1 is a tailgate trim element. To be specific, FIG. 6 shows an installation situation of the interior trim element 1 in the region of a tailgate 13 on the motor vehicle. The interior trim element 1 surrounds a pivotably mounted support connecting the tailgate 13 to the vehicle body 14. Here, the support is accommodated at least partially in the interior space 5 of the main body. As can be seen, the film hinges 8a, 8b, 8c by means of which the clip elements 7a, 7b, 7c are attached to the main body are covered, and therefore strain whitening marks that may be formed at the film hinge are not visible.

What is claimed is:

1. An interior trim element for a motor vehicle, comprising
a body with a U-shaped cross section comprising at least one clip element pivotably attached to the body on a shoulder created on the body side on an edge portion of the body that delimits an interior space,
wherein the shoulder is physically offset inward toward the interior space with respect to a free end of the edge portion, whereby the shoulder projects into the interior space of the main body.

2. The interior trim element as claimed in claim 1, wherein the shoulder is offset inward by a certain amount in comparison with the free end of the edge portion based on a longitudinal extension of the edge portion when viewed in cross section.

3. The interior trim element as claimed in claim 1, wherein the shoulder is offset inward by a certain amount from an outer surface forming an outer side of the body based on a transverse extension of the edge portion when viewed in cross section.

4. The interior trim element as claimed in claim 1, wherein a trough-like depression is formed between the free end of the edge portion and the shoulder.

5. The interior trim element as claimed in claim 1, wherein the shoulder is arranged offset with respect to the free end of the edge portion so that a film hinge is pivotably arranged on a nonvisible side of the body of the interior trim element when fitted to a vehicle body.

6. The interior trim element as claimed in claim 1, wherein the at least one clip element is pivotable between a first pivoted position, in which the at least one clip element allows access to the interior space, and a second pivoted position, in which the at least one clip element at least partially prevents access to the interior space.

7. The interior trim element as claimed in claim 1, wherein the at least one clip element is provided in the region of its free end remote from a film hinge with a fastening portion of the clip element whereby the at least one the clip element is detachably fastenable on a fastening portion of the body.

8. The interior trim element as claimed in claim 7, wherein the fastening portion of the clip element and the fastening portion on the body are latching or snap-in elements.

9. The interior trim element as claimed in claim 7, wherein the fastening portion on the clip element and the fastening portion on the body comprise latching/snap-in elements.

10. The interior trim element as claimed in claim 1, wherein the body and/or the at least one clip element and/or the at least one film hinge (8a, 8b, 8c) and/or the shoulder (11) is/are formed from a thermoplastic material.

11. The interior trim element as claimed in claim 10, wherein the thermoplastic material is acrylonitrile butadiene styrene, polyamide, polycarbonate, polyethylene, polypropylene or polystyrene.

12. The interior trim element as claimed in claim 1, wherein the at least one clip element is pivotably attached to the body by at least one film hinge formed on the shoulder.

13. The interior trim element as claimed in claim 12, wherein the body and the at least one clip element and the at least one film hinge and the shoulder are formed integrally with one another.

14. The interior trim element as claimed in claim 12, the at least one clip element and the least one film hinge are integrally formed on the edge portion of the body that partially delimits the interior space.

15. The interior trim element as claimed in claim 12, wherein the interior space of the body serves as a receiving region for functional components of a motor vehicle equipped with the interior trim element.

16. The interior trim element as claimed in claim 1, wherein it is a tailgate trim component.

* * * * *